US009079574B2

(12) United States Patent
Burke et al.

(10) Patent No.: US 9,079,574 B2
(45) Date of Patent: Jul. 14, 2015

(54) METHOD FOR CONTROLLING A MOTOR VEHICLE POWERTRAIN

(75) Inventors: Matthew Piers Burke, Clitheroe (GB); Matthew Gibson Field, Longridge (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 1453 days.

(21) Appl. No.: 11/572,758

(22) PCT Filed: Aug. 8, 2005

(86) PCT No.: PCT/GB2005/003098
§ 371 (c)(1),
(2), (4) Date: Nov. 4, 2008

(87) PCT Pub. No.: WO2006/027540
PCT Pub. Date: Mar. 16, 2006

(65) Prior Publication Data
US 2009/0076691 A1 Mar. 19, 2009

(30) Foreign Application Priority Data
Sep. 9, 2004 (GB) .................................. 0420007.7

(51) Int. Cl.
*F16H 61/47* (2010.01)
*G06F 17/00* (2006.01)
(Continued)

(52) U.S. Cl.
CPC .............. *B60W 10/06* (2013.01); *B60W 10/109* (2013.01); *B60W 30/18* (2013.01); *F16H 61/472* (2013.01); *F16H 61/66* (2013.01); *B60K 2741/145* (2013.01); *F16H 61/664* (2013.01)

(58) Field of Classification Search
CPC ....... F16H 61/47; F16H 61/472; F16H 61/66; F16H 61/662; F16H 61/66204; F16H 61/66213; F16H 61/6625; F16H 61/66272; F16H 61/66277; F16H 61/66281; F16H 61/664; B60K 2741/12; B60K 2741/14; B60K 2741/145; B60W 10/06; B60W 10/101; B60W 10/105; B60W 10/107; B60W 10/109; B60W 30/18; B60W 2540/10; B60W 2710/0666; B60W 2710/0672; B60W 2710/1005; B60W 2710/105
USPC ............................... 701/51; 477/43, 107, 110
See application file for complete search history.

(56) References Cited

U.S. PATENT DOCUMENTS

| 5,305,662 A | 4/1994 | Togai et al. |
| 5,496,227 A * | 3/1996 | Minowa et al. ................. 477/62 |

(Continued)

FOREIGN PATENT DOCUMENTS

| EP | 0 925 992 A2 | 6/1999 |
| EP | 0 925 992 A3 | 6/1999 |

(Continued)

*Primary Examiner* — Jerrah Edwards
(74) *Attorney, Agent, or Firm* — Blakely, Sokoloff, Taylor & Zafman LLP (57) ABSTRACT

The invention is concerned with control of a motor vehicle powertrain having a transmission of torque-controlled type. The powertrain also has an engine which provides a controllable engine torque. The method involves determining a reaction torque requirement and an engine torque requirement suitable to create a desired wheel torque and also a desired engine acceleration. The engine torque and the reaction torque provided by the transmission are set accordingly. The invention is characterized by the fact that the aforementioned calculation involves estimating and allowing for vehicle acceleration.

14 Claims, 7 Drawing Sheets

(51) Int. Cl.
   *B60W 10/06* (2006.01)
   *F16H 61/472* (2010.01)
   *B60W 10/109* (2012.01)
   *B60W 30/18* (2012.01)
   *F16H 61/66* (2006.01)
   *F16H 61/664* (2006.01)

(56) References Cited

U.S. PATENT DOCUMENTS

| | | |
|---|---|---|
| 5,521,819 A | 5/1996 | Greenwood |
| 5,595,551 A | 1/1997 | Hedström et al. |
| 5,766,105 A * | 6/1998 | Fellows et al. ............... 474/18 |
| 6,370,462 B1 | 4/2002 | Speicher et al. |
| 6,379,281 B1 * | 4/2002 | Collins et al. ............. 477/107 |
| 6,920,865 B2 * | 7/2005 | Lyon ........................... 123/399 |
| 7,027,904 B2 * | 4/2006 | Ishizu et al. ................. 701/93 |

FOREIGN PATENT DOCUMENTS

| | | |
|---|---|---|
| EP | 0 953 469 A2 | 11/1999 |
| EP | 0 953 469 A3 | 11/1999 |
| EP | 1 186 462 A2 | 3/2002 |
| EP | 1 188 602 A3 | 3/2002 |
| EP | 1 366 946 A2 | 12/2003 |
| GB | 2430718 | 4/2007 |

* cited by examiner

METHOD FOR CONTROLLING A MOTOR VEHICLE POWERTRAIN

CROSS-REFERENCE TO OTHER APPLICATIONS

This is a National Phase of International Application No. PCT/GB2005/003098, filed on Aug. 8, 2005, which claims priority from Great Britain Patent Application No. 0420007.7, filed on Sep. 9, 2004.

BACKGROUND OF THE INVENTION

1). Field of the Invention

The present invention is concerned with control of a motor vehicle powertrain having a continuously variable transmission of torque-controlled type.

2). Discussion of Related Art

In any continuously variable transmission there is a unit, referred to herein as a "variator", which provides a continuously variable drive ratio. The variator couples to other parts of the transmission—typically gearing leading on one side of the variator to the engine and on the other side to driven components such as the driven wheels of a motor vehicle—through rotary input and output members. The ratio of rotational speeds of the variator's input and output members is the "variator drive ratio". The overall ratio of speeds of input and output members of the transmission itself—coupled to the engine and the driven wheels respectively—is the "transmission ratio".

The concept of "torque control" is known in this art but will now be explained. It is useful to distinguish torque control from the alternative of "ratio control".

A ratio-controlled variator receives a control signal representing a required variator drive ratio. The variator responds by adjusting its drive ratio to the required value. The adjustment typically involves detecting the position of a ratio-determining element of the variator (e.g. the separation of the sheaves in a belt-and-sheave variator, or the position of the rollers in a toroidal-race type variator) and adjusting the actual position of this element to a desired position (determined by the control signal) using a feedback loop. Thus in a ratio controlled variator, ratio is a function of the control signal.

This is not the case in a torque-controlled variator. Instead a torque-controlled variator is constructed and arranged such as to exert upon its input and output members a reaction torque which corresponds directly to the control signal. It is torque which is the control variable rather than drive ratio. Changes in speed of the variator input and output, and hence changes in variator drive ratio, result from the application of these torques, added to the externally applied torques (e.g. from engine and wheels), to the inertias coupled to the variator input and output. The variator drive ratio is permitted to change correspondingly. "Reaction torque", as used herein, is the sum of the torques exerted by the variator upon its input and output members.

The challenges involved in controlling a torque-controlled transmission are very different from those involved in controlling a ratio-controlled transmission. In the latter, since the variator maintains a chosen drive ratio, torque at the driven wheels is related directly to engine torque. Engine speed control is a relatively straightforward matter since, by maintaining a set drive ratio, the transmission provides a direct relationship between engine speed and vehicle speed. In a torque controlled transmission, in which drive ratio is not the control variable and is permitted to vary, the engine and wheels can be thought of as being effectively de-coupled from one another. Wheel torque is controlled by the variator rather than by engine torque. Engine speed is not constrained to follow vehicle speed. Instead the control signal applied to the variator determines a loading torque applied by the variator to the engine. Combustion within the engine creates an engine torque. The sum of loading torque and engine torque acts upon the inertia referred to the engine (contributed by masses in both engine and the transmission) and so determines engine acceleration. While the loading torque and the engine torque are equal and opposite, engine speed is constant. Changes in engine speed result from an inequality between these torques. Dynamic matching of engine torque to loading torque is thus fundamental to management of the drive line as a whole and of engine speed in particular. Failure to manage the balance would allow unwanted changes in engine speed.

Effective utilization of torque-controlled transmissions depends on electronics to regulate the engine and transmission in unison. Early papers on the electronic control of such a powertrain are by Stubbs—"The Development of a Perbury Traction Transmission for Motor Car Applications", ASME (The American Society of Mechanical Engineers) paper no. 80-GT-22, March 1980 and also by Ironside and Stubbs "Microcomputer Control of an Automotive Perbury Transmission", IMechE paper no. C200/81, 1981. Both papers describe a project concerned with electronic control of a transmission based on a toroidal-race rolling-traction type variator operating in torque-controlled mode. The driver's demand was interpreted as a requirement for wheel torque, which was then converted into a requirement for engine power by multiplication by the rotational speed of the vehicle wheels. From this power, target values for the engine torque and engine speed were selected. The engine was to produce the target torque, and the variator reaction torque was adjusted to bring the engine speed to the target value, using a closed loop based on engine speed. In this scheme the target engine torque and speed are the values at which the engine would desirably be run in a "steady state" where engine speed was constant. In this steady state the target engine speed and torque, acting through the transmission, would provide the wheel torque demanded by the driver. Stubbs' simple approach to management of engine speed proves inadequate in practice. The transmission ratio is prone to oscillation and the vehicle lacks "driveability". The adjustment of variator reaction torque used to control engine speed means that, when engine acceleration takes place, the actual wheel torque differs from the driver's demand.

A more sophisticated approach involves setting the engine torque not to its target value but instead to a value modified to take account of the engine torque required to accelerate powertrain inertias contributed by rotary components of the engine and transmission. In this way the engine contributes to control of the aforementioned dynamic balance. Calculation of the necessary engine torque has hitherto been based upon a required acceleration of the engine. It has now been recognised, however, that in setting the engine torque account should additionally be taken of the acceleration of the motor vehicle itself.

SUMMARY OF THE INVENTION

In accordance with a first aspect of the present invention, there is a method of controlling a motor vehicle powertrain comprising an engine which provides a controllable engine torque and acts through a continuously variable transmission to apply wheel torque to driven wheel(s) of the motor vehicle, the transmission being of the torque-controlled type, and the method comprising determining a reaction torque requirement and an engine torque requirement suitable to create a desired wheel torque and a desired engine acceleration and setting the engine torque and reaction torque accordingly, and being characterised in that the aforementioned calculation involves estimating and allowing for vehicle acceleration.

Estimation of vehicle acceleration may be based upon the desired wheel torque. Vehicle acceleration additionally depends upon the action of the vehicle brakes, and its estimation preferably includes estimating their braking force. Vehicle acceleration also depends upon variable factors external to the powertrain including vehicle mass and road gradient. An adaptive model is preferably used, which incorporates adjustable parameters representing such external factors, to estimate the vehicle acceleration.

Preferably the desired engine acceleration is determined on the basis of current engine speed and a target engine speed. This may at its simplest involve choosing a target acceleration which is proportional to the difference between current and target engine speeds. A more sophisticated function is preferred, however, to profile the engine acceleration.

Of course in most motor vehicles control is exercised by the driver through an accelerator control such as a pedal. The driver's input is preferably used as the basis for determination of the desired wheel torque.

It is particularly preferred that the engine torque requirement is the sum of (i) the engine torque needed to accelerate moments of inertia of the engine and transmission, taking account of desired engine acceleration and estimated vehicle acceleration and (ii) the engine torque needed to provide the desired wheel torque, acting through the transmission. Hence the engine can be set to provide the torque required both to accelerate the engine and to provide the desired wheel torque. Of course the available engine torque is finite and from time to time the engine torque requirement determined in this way will exceed the engine's capacity. In this circumstance an alternative strategy is used, e.g. to set the engine torque at the available maximum.

It is particularly preferred that a model of the transmission, taking account of both current transmission ratio and transmission efficiency, is used in determining the engine torque needed to provide the desired wheel torque.

In typical transmissions there are rotary inertias whose speed is dependent on both the engine speed/transmission input speed and the speed of the vehicle/transmission output. Preferably, in calculating the engine torque needed to accelerate moments of inertia of the engine and transmission, allowance is made for (a) an engine-side inertia, contributed by those rotary engine and transmission components whose speed is proportional to engine speed, and (b) a free inertia, contributed by those transmission components whose speed is dependent upon speed of both the engine and the driven wheel(s) of the motor vehicle.

It is particularly preferred that acceleration of the free inertia is estimated based upon the desired engine acceleration and the estimated vehicle acceleration.

In such transmissions it is preferred that the engine torque requirement is the sum of (i) the engine torque needed to accelerate an engine-side inertia, contributed by those rotary engine and transmission components whose speed is proportional to engine speed, (ii) the engine torque needed to accelerate a free inertia, contributed by those components of the transmission whose speed is dependent upon speed of both the engine and the driven wheels, and (iii) the engine torque needed to accelerate the vehicle. In this way the engine torque can be accurately set to take account of all of the relevant powertrain inertias.

It is necessary to adjust the variator reaction torque in sympathy with the engine torque. Preferably the reaction torque requirement is the sum of (a) the reaction torque required to cause acceleration of the free inertia, and (b) the reaction torque required to cause acceleration of the vehicle.

A problem arises because the engine's response to its controls cannot be taken to be instantaneous. A lag in the production of engine torque could disrupt control of the dynamic balance of the engine/transmission interface. In accordance with a preferred embodiment, the method further comprises determining, talking account of lag in the engine's response, an estimated instantaneous engine torque, and taking account of this in setting the reaction torque.

In accordance with a second aspect of the present invention there is a method of controlling a motor vehicle powertrain comprising an engine which provides a controllable engine torque and acts through a continuously variable transmission to apply a wheel torque to driven wheel(s) of the motor vehicle, the transmission comprising a variator which has a rotary input and a rotary output and which provides a continuously variable ratio of input to output speed, the variator being of the type which creates a reaction torque, defined as the sum of the torques exerted by the variator at its input and output, which is directly determined by a control signal applied to the variator and which allows its ratio to vary automatically to accommodate consequent changes in its input and output speed, the transmission further comprising gearing by which the variator is coupled between the engine and the driven wheels, wherein moments of inertia of the powertrain comprise (i) an engine-side inertia referred to the variator input comprising components, including rotary engine components, whose speed is proportional to the variator input speed; (ii) a vehicle-side inertia comprising components whose speed is proportional to the variator output speed; and (iii) a free inertia whose speed varies with the speeds of both the variator input and the variator output, the method comprising setting the engine to provide an engine torque which is the sum of (1) engine torque required to provide a desired wheel torque, acting through the transmission, (2) engine torque required to provide a desired acceleration of the free inertia and (3) engine torque required to accelerate the engine-side inertia and setting the variator reaction torque to provide at the variator output the total torque required to (i) provide the desired wheel torque and (ii) accelerate the free inertia such that a net difference between the engine torque and the torque referred to the engine by the variator is suitable to provide the required acceleration of the engine-side inertia.

BRIEF DESCRIPTION OF THE DRAWINGS

Specific embodiments of the present invention will now be described by way of example only, with reference to the accompanying drawings, in which: —

DETAILED DESCRIPTION OF THE INVENTION

1. The Transmission and Variator

The present invention has been developed in connection with a vehicle transmission using a torque-controlled variator of toroidal-race, rolling-traction type. The invention is considered potentially applicable to other types of torque-controlled transmission.

Nonetheless the toroidal-race variator in question will now be very briefly described, in order to illustrate certain relevant principles. More detail on both the construction and function of this type of variator is to be found in various patents and published applications held by Torotrak (Development) Ltd. including European patent EP444086.

Figure 1:
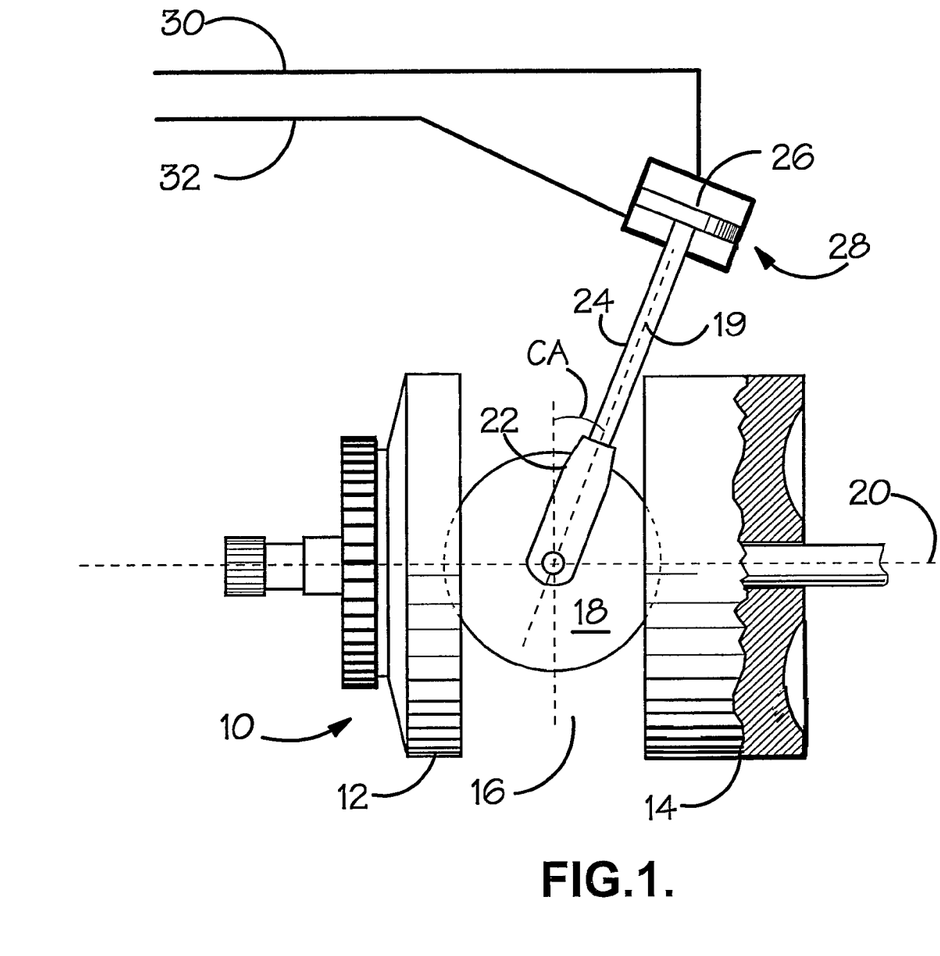
FIG. 1 is a highly simplified illustration of a toroidal-race, rolling-traction variator, of a type known in itself, suitable for use in implementing the present invention.
Figure 2:
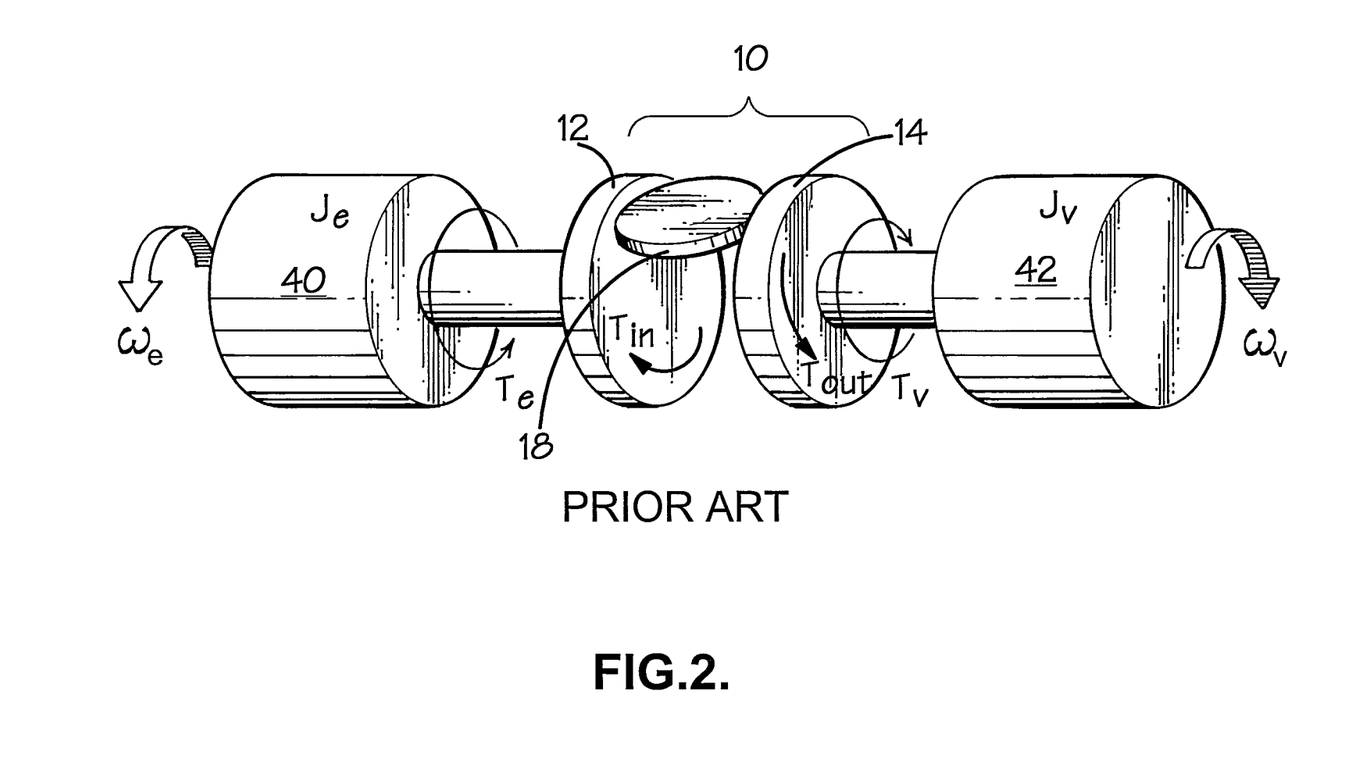
FIG. 2 is a highly schematic representations of a powertrain of torque-controlled type suitable for implementing the present invention.

FIG. 1 illustrates some of the major components of the variator 10 and FIG. 2 illustrates, in highly schematic format, major parts of a drive line incorporating the variator. In FIG. 1 the variator is seen to comprise co-axially mounted input and output discs 12, 14 together defining a toroidal cavity 16 containing a variator roller 18. The roller runs on respective faces of the input and output discs in order to transmit drive from one to the other. The roller is mounted in a manner permitting it to move along a circumferential direction about the axis 20 of the discs 12, 14. The roller is also able to "precess". That is, the roller's axis is able to rotate, changing the inclination of the roller to the disc axis. In the illustrated example the roller is mounted in a carriage 22 coupled by a stem 24 to a piston 26 of an actuator 28. A line 19 from the centre of the piston 26 to the centre of the roller 18 constitutes a "precession axis" about which the whole assembly can rotate. Changes in the inclination of the roller result in changes in the radii of the paths traced on the input and output discs 12, 14 by the roller. Consequently a change in roller inclination is accompanied by a change in variator drive ratio. Note that the precession axis does not lie precisely in a plane perpendicular to the disc axis, but is instead angled to this plane. This angle, labeled CA in FIG. 1, is referred to herein as the "castor angle". As the roller moves back and forth it follows a circular path centred on the disc axis. Furthermore, the action of the discs 12, 14 upon the rollers tends to maintain the rollers at such an inclination that the roller axis intersects the disc axis. This intersection of the axes can be maintained, despite movement of the roller along its circular path, by virtue of the castor angle. The result is that translational movement of the roller about the disc axis is accompanied by precession of the roller and so by a change in variator drive ratio. If one neglects slip between the roller and the discs, the position of the variator roller corresponds to the variator drive ratio and so to the speed ratio between the engine and the driven wheels.

The actuator 28 receives opposed hydraulic fluid pressures through lines 30,32 and force applied to the roller by the actuator corresponds to the difference in pressures in the lines. This pressure difference is the primary control signal applied to the variator, in this example. The effect of this force is to urge the roller to move along its circular path about the disc axis. Equivalently one can say that the actuator exerts a torque about the disc axis upon the roller. The actuator torque is balanced by torque created by the interaction of the roller with the discs. The roller exerts a torque $-T_{in}$ upon the input disc 12 and a torque $-T_{out}$ upon the output disc 14. Correspondingly the discs together exert a torque $T_{in}+T_{out}$ upon the roller, about the disc axis. The quantity $T_{in}+T_{out}$ (the reaction torque) is equal to the actuator torque and so directly proportional to the control signal formed by the aforementioned pressure difference. Hence this control signal determines the reaction torque created by the variator.

The illustrated variator 10 is of course greatly simplified for the sake of clarity. For instance a practical variator typically has two pairs of input/output discs defining two toroidal cavities each of which contains a set of rollers. In such an arrangement the reaction torque is the sum of the torques applied to all of the variator rollers. The principles of operation set out above are however essentially unchanged in a practical transmission.

2. The Dynamic Balance at the Engine/Transmission Interface

FIG. 2 is a highly simplified representation of a transmission using a torque-controlled variator, intended to illustrate some of the issues involved in management of such a transmission.

Box 40 represents the total moment of inertia $J_e$ referred to the engine (input) side of the variator. The moment of inertia of the rotating parts of the engine, as well as the moments of inertia of certain parts of the transmission, contribute to the engine-side inertia $J_e$. In this highly simplified drawing a direct coupling is shown between the variator input disc 12 and the box 40 representing the engine-side inertia $J_e$. In a real transmission, of course, one would have to take account of gearing interposed between the engine and the variator.

Box 42 represents the total moment of inertia $J_v$ referred to the vehicle (output) side of the variator (the "vehicle-side inertia"). Contributions to this inertia come from rotating masses on the vehicle side of the powertrain, such as the vehicle wheels, differential gear and the gearing coupling it to the variator, but also from the mass of the vehicle itself, whose linear inertia acting through the vehicle wheels can be treated as contributing to the vehicle-side moment of rotary inertia.

As explained above, by setting the primary control signal to the variator 10, the reaction torque $T_{in}+T_{out}$ is determined. $T_{in}$ and $T_{out}$, the torques created at the input and output discs of the variator, are marked in the drawing. Note also that the ratio $T_{in}/T_{out}$ is (neglecting frictional losses) equal to the variator ratio. Hence for a given instantaneous variator ratio, setting the variator's control signal determines both $T_{in}$ and $T_{out}$.

Consider now the torques acting upon the engine-side inertia $J_e$. Combustion within the engine creates an engine torque $T_e$. (Note that the "engine torque", as the term is used herein, is not necessarily the torque acting upon the engine's output shaft, since while the engine is accelerating some of the engine torque is reacted by the engine's own rotary inertia). The transmission exerts upon the inertia $J_e$ a loading torque which, in the highly simplified example illustrated, is equal to the torque $T_{in}$ at the variator input disc (in a practical transmission the effect of intervening gearing between engine and variator would have to be taken into account). The sum of the engine torque $T_e$ and the loading torque acts upon the engine-side inertia $J_e$ so that an inequality between loading torque and engine torque causes acceleration of this inertia and hence change in engine speed $\omega_e$. The variator automatically accommodates the resultant change in transmission ratio. Hence in order to control engine speed it is necessary to control the dynamic balance between the engine torque and the loading torque applied to the engine by the transmission. This must be done while at the same time providing the driver with torque at the driven wheels of the vehicle ("wheel torque") which acceptably reflects the driver's demand as communicated through the accelerator control.

Looking now at the vehicle (output) side of the transmission, the variator output torque $T_{out}$ is, at a given instantaneous drive ratio, determined by the variator control signal, as explained above, and is passed on to the vehicle wheels. Again the drawing is highly simplified in showing the variator output disc 14 as being coupled directly to the vehicle-side inertia $J_v$, whereas in reality gearing couples the variator to the vehicle wheels, and it is through the wheels that the inertia due to the vehicle mass makes its contribution. Acceleration of the variator output disc, and hence of the driven vehicle wheels and the vehicle itself, results from a net imbalance between the variator output torque $T_{out}$ and the torques referred to the variator from the vehicle wheels (dependent on road gradient, drag etc) and also the vehicle brakes. Vehicle speed change results in change of the rotational speed of the variator output disc, and again the consequent change of variator ratio is automatically accommodated by the variator.

One of the main tasks of the system controlling the powertrain is to manage the aforementioned dynamic balance between engine and loading torque, to control engine speed, while at the same time providing torque at the driven wheels which reflects the driver's requirements. This balance can be altered through adjustments to engine torque and to reaction torque.

3. Powertrain Inertias

It must be stressed that FIG. 2 is a highly simplified representation intended largely to illustrate the significance of the dynamic balance between engine and transmission. A more sophisticated understanding of the dynamics of the transmission is required for the discussion below. In FIG. 2 the powertrain inertias are represented by two quantities—the engine-side inertia $J_e$ and the vehicle-side inertia $J_v$. It has now been recognised that in current transmissions there is a third inertia which can accelerate at a rate different from the other two and therefore falls to be considered separately from them. This will be referred to as the transmission's free inertia $J_f$. To understand its origin it is necessary to consider in more detail the construction of a practical, multi-regime continuously variable transmission, as illustrated (in schematic form) in FIGS. 3 and 4.

Figure 3:
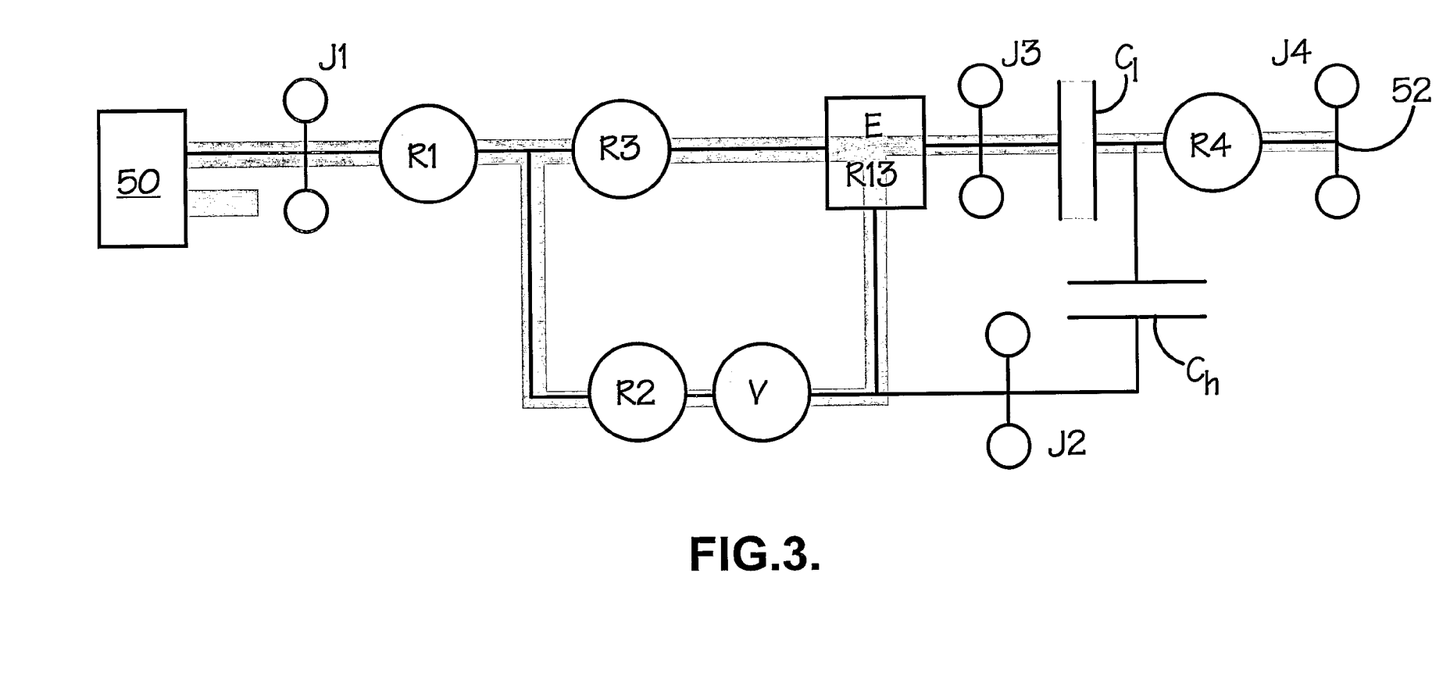
FIGS. 3 and 4 are both schematic representations of a "power-recirculatory" type multi-regime transmission suitable for use in implementing the present invention.
Figure 4:
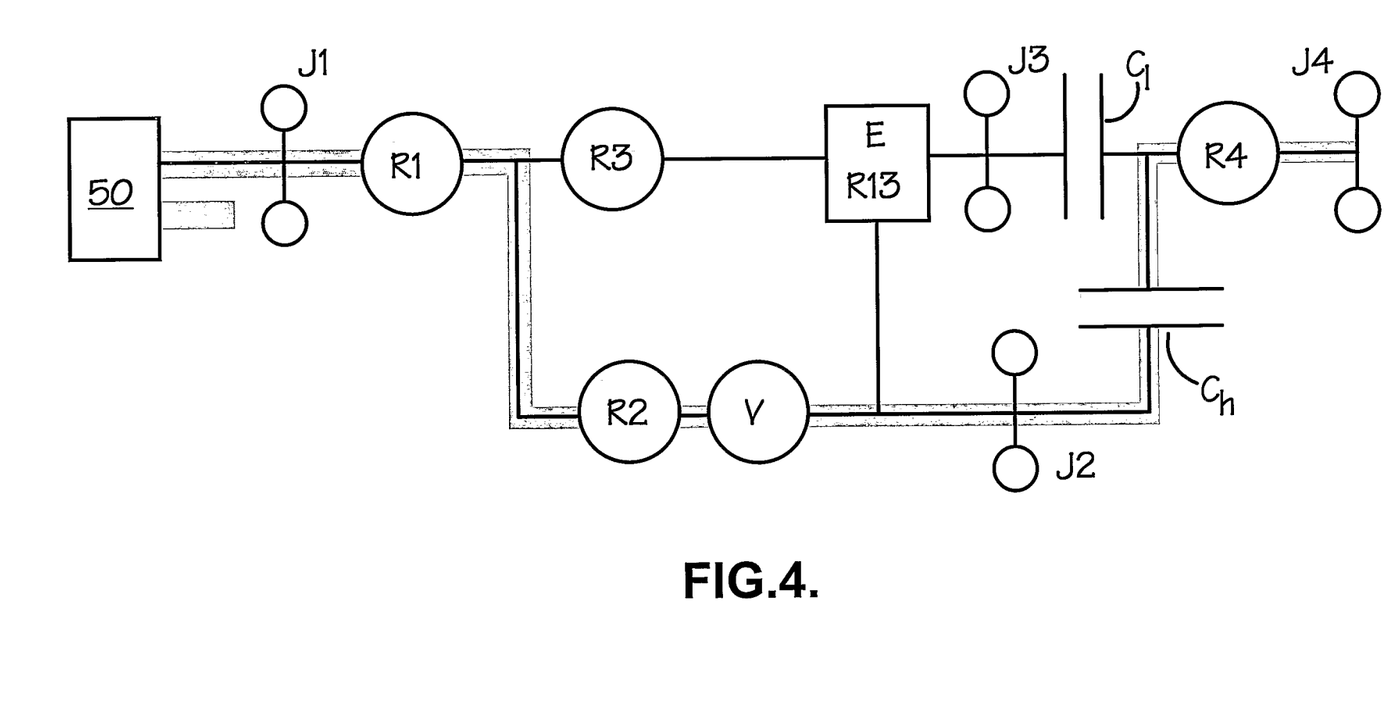

Such transmissions use gearing and some form of releasable engagement means such as clutches or brakes to enable the variator to be coupled between the engine and driven wheels in two or more different regimes, the relationship between variator ratio and the overall drive ratio of the transmission being different in the different regimes. In this way the transmission can provide a range of ratios larger than that offered by the variator alone. Such transmissions are well known to the skilled person and their physical construction will not be described in detail herein.

In both of FIGS. 3 and 4 box 50 represents the vehicle engine. The variator is indicated at V and an epicyclic mixer gear at E. Epicyclic gearing will be familiar to the skilled person. Mixer gear E has three rotary shafts coupled respectively to sun, planet and ring gears of the epicyclic (not shown). Items $R_1$-$R_4$ are each fixed ratio gearing. Clutches $C_h$ and $C_1$ serve respectively to engage high and low transmission regimes. The engine is coupled through gearing $R_1$, $R_3$ to one shaft of the epicyclic mixer. It is also coupled through gearing $R_1$, $R_2$ and variator V to a second of the epicyclic mixer's shafts. The third shaft of the epicyclic mixer is able to be coupled through low regime clutch $C_1$ and gearing $R_4$ to the transmission output 52. Consequently when clutch $C_1$ is engaged (and clutch $C_h$ is disengaged) as shown in FIG. 3, power is transmitted through the epicyclic mixer E to the output, as well as being recirculated in a loop comprising the mixer E, the variator V and the gearing $R_2$, $R_3$. When low regime clutch $C_1$ is disengaged and high regime $C_h$ clutch is engaged, however, as shown in FIG. 4, the mixer is effectively removed from the power path between the engine and wheels. Instead this path is through gears $R_1$, $R_2$, $R_4$ and the variator V.

Inertias in the powertrain are in these drawings schematically represented at:—

$J_1$, the moment of inertia of the engine and of those parts of the transmission coupled directly to the engine—that is, those parts which are coupled to the engine without clutches, variator or mixer as intermediary, and so rotate at a speed equal or proportional to that of the engine in both regimes;

$J_2$, the inertia of the variator output discs and of those parts of the transmission directly coupled to it;

$J_3$, an inertia contributed by those parts of the transmission directly coupled to the output of the epicyclic mixer E; and $J_4$, the inertia referred to the transmission output, including the inertia of the vehicle itself (which again can be treated as a moment of inertia acting through the vehicle wheels) and that of the downstream powertrain components—final gearing, differential gear, driven wheels etc.

The three aforementioned moments of inertia $J_v$, $J_e$, $J_f$ needed to understand and model the powertrain's behaviour can be expressed in terms of $J_1$-$J_4$, although the expressions are different in high and low regimes. In low regime (FIG. 3) the vehicle-side inertia $J_v$ comprises the vehicle's inertia $J_4$ added to the transmission inertia $J_3$ which is coupled to it through clutch $C_1$. Transmission inertia $J_1$ needs to be considered separately from both $J_e$ and $J_v$ because changes in its rotational speed are different from either. Hence in low regime $J_1$ forms the free inertia $J_f$.

In high regime the vehicle-side inertia $J_v$ is formed by the vehicle's inertia $J_4$ added to transmission inertia $J_2$, these being directly coupled through engaged clutch $C_h$. Here, transmission inertia $J_3$ is subject to speed changes different from those experienced by both $J_e$ and $J_v$, and forms the free inertia $J_f$.

4. The Control System

Overview

Figure 5:
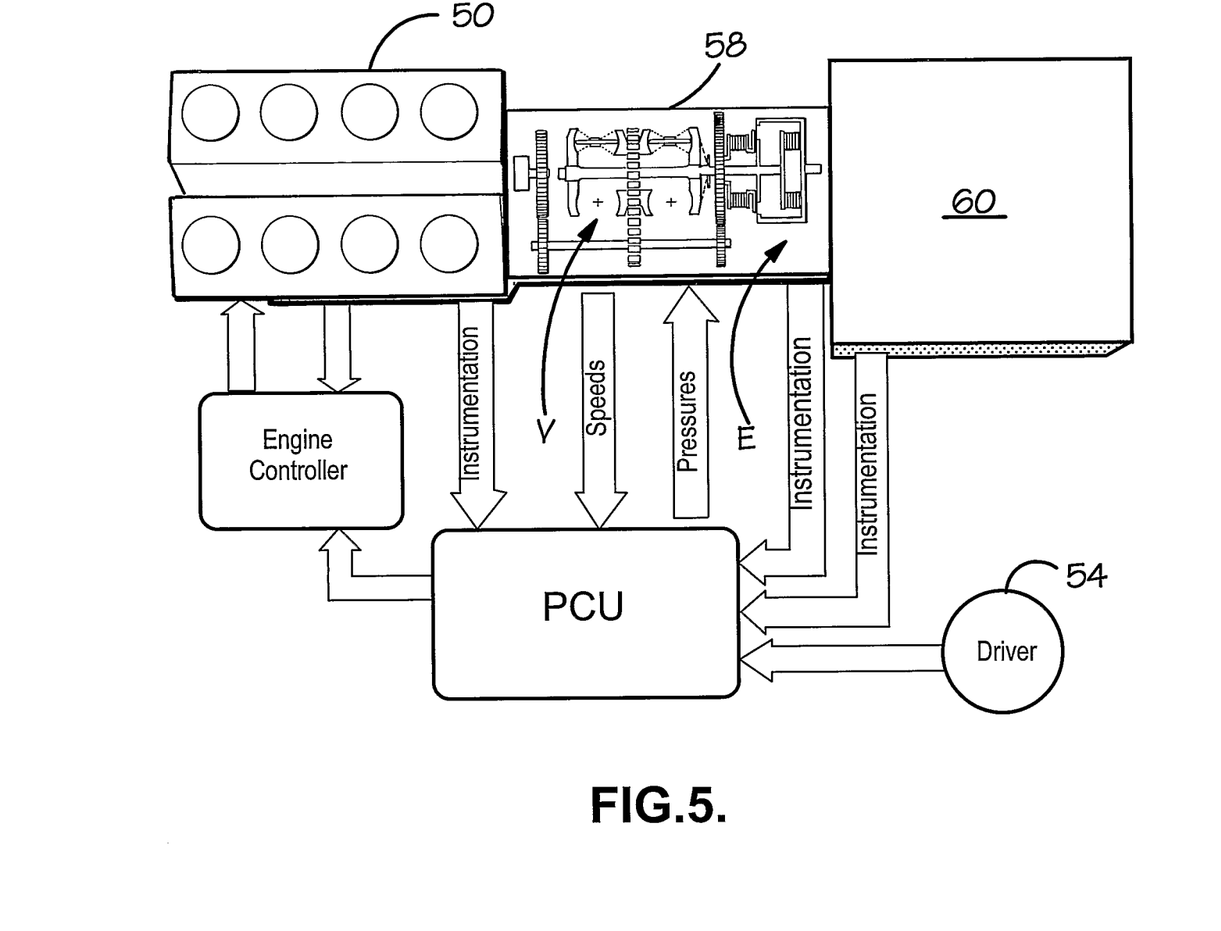
FIG. 5 is a schematic representation of a control system for use in implementing the present invention.

A broad overview of the main components of a powertrain control system embodying the present invention is provided in FIG. 5. In this drawing the engine is again represented at 50.

The control of both engine and transmission is performed electronically, subject to direction from the driver. Conventional digital microprocessors are programmed for this task in the present embodiment. The illustrated architecture serves as an example only and may be further simplified in production versions, but comprises an electronic Powertrain Control Unit ("PCU") which receives data from instrumentation associated with the engine, the transmission and also from the driver's control 54 (formed e.g. by the accelerator pedal of a conventional motor vehicle). In response the PCU provides outputs controlling both engine and transmission. Engine control is carried out through an electronic engine controller 56. The transmission itself is seen in schematic form at 58, and includes the variator V and epicyclic mixer E. A box 60 represents the vehicle as a whole.

The powertrain control system to be described below, implemented in software and principally in the PCU, can be thought of as involving, at a high level, three main operations which are repeated at frequent intervals: —

1. Interpret Driver Demand. The driver of course conventionally controls the vehicle through an accelerator control such as the pedal 54. In the present system the driver's input is interpreted to provide base requirements for (1) engine speed and (2) engine torque.
2. Select Required Engine and Transmission Settings. These are based upon the base engine speed/torque requirements but differ from them as necessary to provide for acceleration of powertrain inertias to achieve the desired engine speed.
3. Correct Engine and/or Transmission Settings. In the present system this is done in a feedback loop, based upon engine speed, with the objective of correcting engine speed toward a predicted profile.

While the present invention is concerned in particular with the second of these operations, the first and third will also be described in order that the operation of the system can be understood.

5. Interpretation of Driver Demand

Figure 6A:
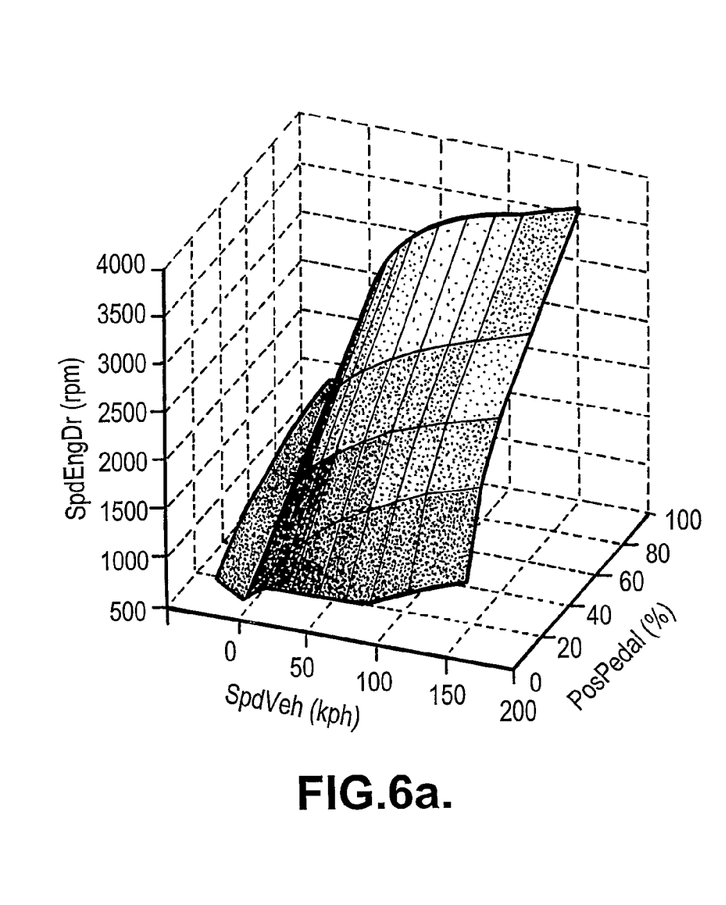
FIGS. 6a and 6b are graphs representing the interpretation of a driver's control input in a control system embodying the present invention.
Figure 6B:
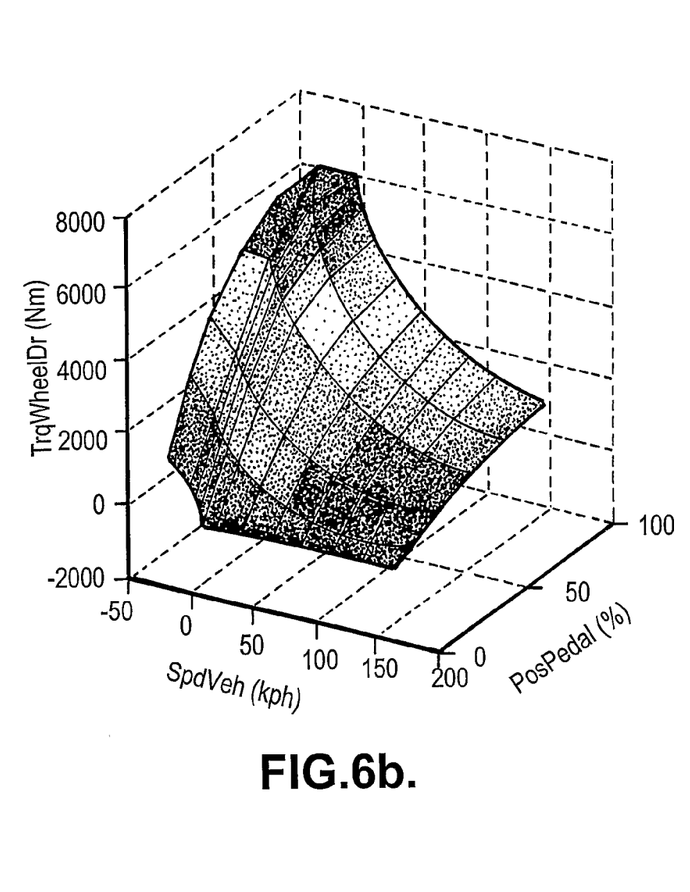

The control system initially maps the position of the accelerator control onto driver demands for (A) torque at the driven vehicle wheels (referred to below simply as "wheel torque") and (B) engine speed. In doing so it takes account of current vehicle speed. FIG. 6a is a graph showing the driver demand for engine speed (SpdEngDr) against the vehicle speed (SpdVeh) and the accelerator pedal position (PosPedal). FIG. 6b is a graph of the driver demand for wheel torque (TrqWheelDr), once more plotted against vehicle speed and accelerator pedal position. These relationships are recorded within the control system, talking the form of look-up tables in the present embodiment.

A model of the transmission is then used to calculate what engine torque is needed to provide the wheel torque demanded by the driver. The model takes account of course of current transmission ratio and allowance is also made for energy losses within the transmission. The model's output serves as the driver's requested engine torque.

Hence the system as described so far provides values, corresponding to the driver demand, for both engine speed and engine torque. These may be passed to other parts of the control system unmodified. However the present system also offers the potential to improve performance, e.g. with regard to fuel economy, by modifying the driver's demands. This is done by first multiplying the demanded engine torque by the demanded engine speed to obtain a value of engine power corresponding to the driver demand, this demanded engine power then being used in conjunction with an engine map, or set of maps, to determine modified values for engine torque and speed which provide the demanded power. The map or maps are recorded within the control system. A map may for example be used to optimise fuel efficiency. For any level of power demanded of the engine there is a combination of engine speed and engine torque which provides that power for least expenditure of fuel. On a graph of engine speed against engine torque the locus of such points forms an "optimal efficiency line" and the control system may be arranged to select points upon this line for engine operation, deviating from it e.g. where the most fuel efficient engine operating point would produce unacceptable noise, vibration and harshness (NVH).

Whether or not the driver's demanded values are modified, the outputs from the first part of the control system so far described comprise (1) the base requirement for engine torque (which will be given the variable name TrqEngBaseReq) and (2) the base requirement for engine speed (SpdEngBaseReq).

6. Selection of Required Engine and Transmission Settings

Figure 7:
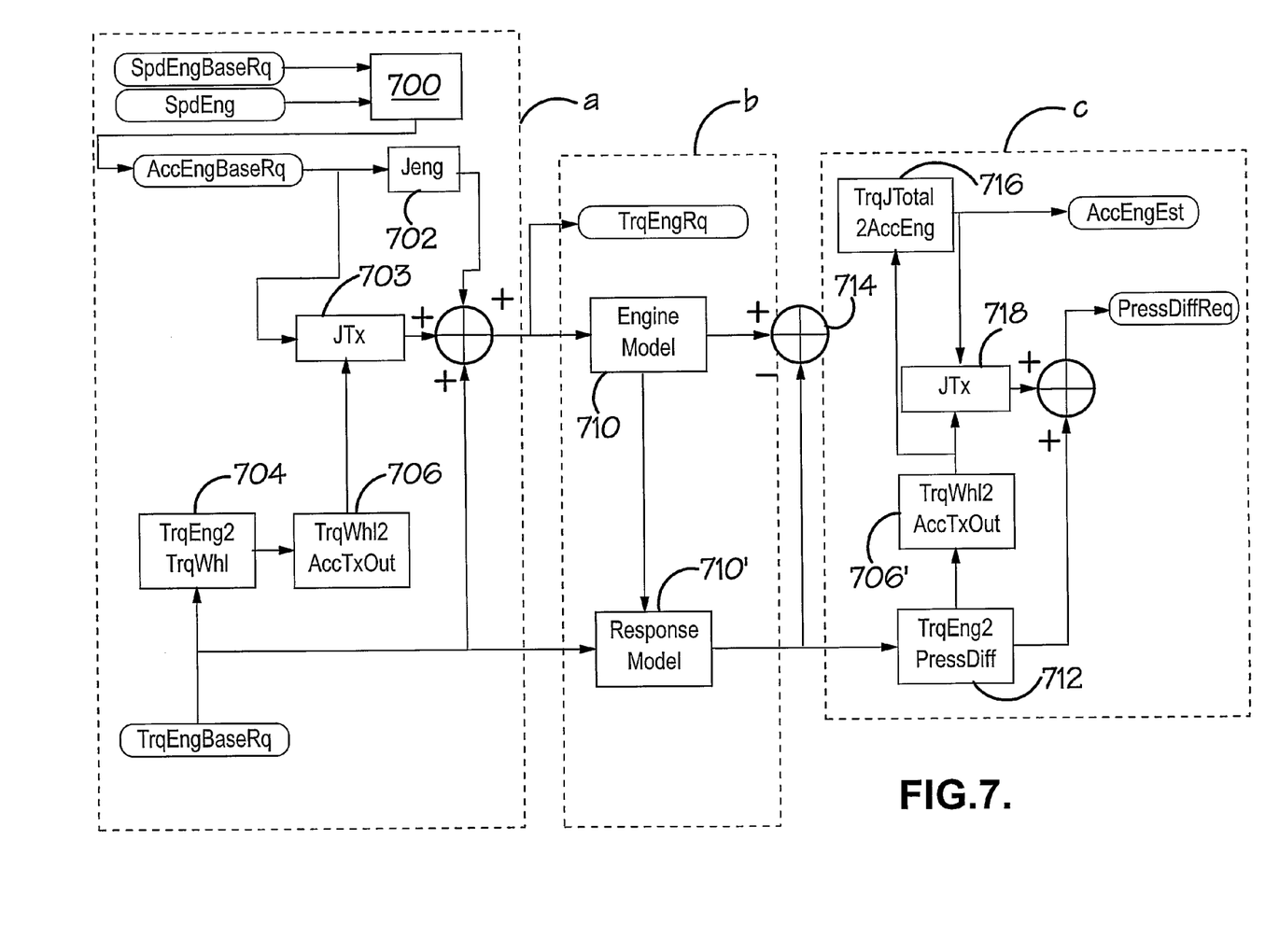
FIG. 7 is a flow diagram representing a method of powertrain control embodying the present invention.

As explained above, control of engine speed in a powertrain incorporating a torque controlled transmission depends upon management of the balance between the torque created by the engine and the loading applied to the engine by the transmission. Furthermore the requirements imposed on the powertrain are highly dynamic. The driver's demands for engine speed and torque change frequently, as does the load at the transmission output (due to road gradient, vehicle braking etc). There is typically a discrepancy between the base requirement for engine speed and the actual engine speed. Settings for the engine torque controller and the transmission are required which serve to accelerate the engine toward the base speed requirement while providing a wheel torque which acceptably reflects the driver's demand. FIG. 7 is a block diagram showing the functional elements of the strategy, implemented in the PCU, for selecting these settings.

Input to this strategy, as shown to the left of the diagram, are the base requirements SpdEngBaseReq and TrqEngBaseReq produced by the interpretation of the driver's demand. The strategy's outputs are (1) a request TrqEngReq for engine torque, (2) a request PressDiftReq for differential pressure to be applied to the variator (and it will be recalled from the earlier discussion of the variator that the pressure differential applied to it corresponds to the reaction torque which it creates) and (3) a prediction AccEngEst of the engine acceleration. The significance of this third output will be explained below. The manner in which the outputs are obtained from the inputs can be considered to involve three main steps: — a. determine the engine torque required to accelerate powertrain and vehicle inertias and use this to form the engine torque requirement;
b. model the engine's response to the resulting engine torque request; and
c. set the variator reaction torque based upon the engine response model.

Dotted boxes a, b, c in FIG. 7 contain the functional elements which perform these steps, as will now be explained in more detail, beginning with step a.

6a. Formation of Engine Torque Requirement

To determine the net torque required of the engine it is necessary to consider (i) the torque required to accelerate the engine (i.e. to accelerate the engine-side inertia $J_e$), (ii) the torque required to accelerate the transmission's free inertia $J_f$ and (iii) the torque required to drive the vehicle wheels. These calculations will now be considered in turn.

6a (i) Torque to Accelerate Engine-Side Inertia.

Recall that one of the functions of the control system is to manage changes in engine speed—i.e. changes in the rotational speed of the engine-side inertia $J_e$. The goal is to adjust engine speed toward the base requirement SpdEngBaseReq. To this end a profiler function 700 receives both the base requirement SpdEngBaseReq and the current engine speed SpdEng, and by comparison of the two defines a base requirement for engine acceleration, AccEngBaseReq. The profiler may for example set AccEngBaseReq to be proportional to the current difference between SpdEngBaseReq and SpdEng, so that the engine's acceleration is proportional to the difference between actual and base required engine speeds. Other relationships can alternatively be used. Functional block 702 serves to calculate what net torque needs to be applied to the inertia $J_e$ to accelerate it at the base required rate AccEngBaseReq.

6a (ii) Torque to Accelerate Free Inertia.

The rotational speed of the free inertia $J_f$ depends upon the rotational speed of both the engine and the vehicle wheels, as will be clear from FIGS. 3 and 4. Hence to obtain the acceleration of free inertia $J_f$, both vehicle and engine acceleration are needed. It has already been explained how the system obtains a required value for engine acceleration and this value AccEngBaseReq is input to block 703 which serves to calculate the torque required to accelerate the free inertia. The same block also receives an estimate of vehicle acceleration, obtained as follows.

The driver's input through the accelerator control, interpreted as explained above as a base requirement for engine torque, effectively defines a required vehicle acceleration. To establish what this value is, the base engine torque requirement TrqEngBaseReq is supplied to a transmission model 704 whose purpose is to calculate, for a given torque applied by the engine to the transmission input, what torque TrqWhl results at the output to the driven wheels. The model takes account of course of current (instantaneous) variator ratio and makes allowance also for energy losses (eg. due to friction) going on within the transmission. The wheel torque thereby calculated is output to a vehicle model 706 which estimates the resulting vehicle acceleration. At its simplest such a model could simply involve subtracting an estimate of a retarding force on the vehicle due to braking, drag and friction from the propulsive force created by the wheel torque, and then dividing by vehicle mass. In the present embodiment the model is in fact more sophisticated, using adaptive techniques to allow for variable factors including road gradient, changes in vehicle mass etc. The vehicle acceleration obtained from vehicle model 706 is passed, as already pointed out, to the block 703.

The relationship between vehicle speed, engine speed and free inertia speed is dependent upon the transmission regime, as also is the magnitude of the free inertia, so block 703 receives as a further input the current regime. This is not indicated in the drawing, which is simplified in this and various other respects for the sake of clarity.

6a. (iii) Torque Required to Drive Vehicle Wheels.

A value TrqEngBaseReq for this torque was obtained at the stage of interpretation of driver demand.

Summing junction 710 adds the above three torques and its output forms TrqEngReq, a request for engine torque which is passed on to the engine control strategy.

6b. Modelling of Engine Response

An internal combustion engine does not respond instantaneously to the controls—fuelling etc.—by which the engine's torque is set. Instead there is a lag between adjustments to the engine settings (resulting from changes in the torque request TrqEngReq used in controlling the engine) and a corresponding change to engine torque. Hence in a dynamic situation there is a discrepancy between the engine torque request and the engine torque actually produced. If no account were taken of this discrepancy in controlling the dynamic balance between engine torque and loading torque then errors would result, impairing control of engine speed. Therefore the present system uses an engine model 710 which, based upon the engine torque request, produces an estimate of the instantaneous engine torque. In the present embodiment the engine model is simply formed as a first order, low pass filter having a time constant which is adjusted according to engine operating factors. In fact the same model is represented in duplicate in FIG. 7 performing two separate operations. At 710 the engine model is seen to receive the engine torque request TrqEngReq, and so outputs an estimate of the actual engine torque. However at 710' the model is supplied instead with the base engine torque request TrqEngBaseReq and so outputs an estimate of the engine torque which would be provided if the engine were set according to the base request. The parameters of the model 710 (specifically its time constant, in the present embodiment) are identical to those of the model 710' and are chosen to correspond to current engine operating conditions. The purpose of the dual use of this model will be explained below.

6c. Setting Variator Reaction Torque

Up to now it has been explained how a requirement for engine torque is obtained. The other main powertrain control variable is the reaction torque to be created by the variator, which in the type of hydraulically controlled variator discussed above is determined directly by the pressure difference across the variator's actuators 28. It will now be explained how the system determines a requirement for reaction torque/pressure difference, to be used in setting the variator hydraulics.

In section 6 above, the engine torque requirement was formed from three components: (i) the torque required to accelerate the engine-side inertia $J_e$; (ii) the torque required to accelerate the transmission free inertia $J_f$; and (iii) the torque required to drive the vehicle wheels (i.e. the torque applied to the vehicle-side inertia $J_v$). Of these, components (ii) and (iii) must be reacted by the variator in order to act upon the relevant inertias $J_f$, $J_v$. Hence the variator is set to react these two torque components. As a result the difference between the engine torque and the loading torque reacted by the variator to the engine should be equal to (i), providing the required net torque to accelerate the engine. The two contributions (ii) and (iii) to the variator reaction torque are calculated separately and then added to obtain the total variator reaction torque. In fact what the system calculates is not reaction torque as such, but instead the required pressure difference across the pistons of the variator actuators.

Looking firstly at calculation of (iii), the reaction torque/pressure difference required to drive the vehicle wheels, it should be recalled that the driver's demand determines a base engine torque request TrqEngBaseReq. This has been chosen to be the engine torque which would (under conditions of constant engine and vehicle speed, with no torque acting to accelerate powertrain inertias) provide the wheel torque demanded by the driver. Hence the system calculates this contribution to the variator pressure difference by converting the base engine torque request TrqEngBaseReq to an equivalent pressure difference, the conversion being carried out by a transmission model 712. The transmission model 712 receives various inputs (not illustrated) relating to the current transmission operating condition including the current variator ratio and transmission regime, these being necessary in determining the required pressure difference. Note however that the base engine torque request is modified, before it is supplied to the transmission model 712, by the engine model 710'. As explained above, this model allows for the lag in the engine's torque response when the requested engine torque is changed.

Turning now to the calculation of (ii), the contribution to the reaction torque required to accelerate the transmission free inertia $J_f$, it must be noted that in low regime the rotational speed of $J_f$ depends upon the speed of both the engine and the vehicle wheels, since this inertia is coupled to both through the epicyclic mixer E. The illustrated control system estimates acceleration of $J_f$ based on estimated accelerations of both the engine and the vehicle wheels. To obtain a prediction of the vehicle wheel acceleration, use is made of vehicle model 706', which is identical to the model 706 discussed above. In this case the vehicle model receives an estimated value of current wheel torque output from the transmission model 712.

To obtain a prediction of engine acceleration, a value is needed of the net torque acting upon the engine-side inertia $J_e$. To obtain this, at 714 the output of engine model 710' (i.e. the estimated engine torque if the engine were set to provide the base engine torque request) is subtracted from the output of engine model 710 (the estimated current engine torque). An adjustment is required, however, to deduct the engine torque used in accelerating the transmission free inertia $J_f$. This adjustment is effected at block 716, which also uses the resultant torque value to provide a predicted value of engine acceleration AccEngEst.

Functional block 718 receives the predictions of both engine and free inertia acceleration and based upon them, and taking account of the current transmission regime, calculates the torque taken up in accelerating the inertia of the powertrain. The same block converts the resulting torque value to a pressure difference value.

Finally by adding the two contributions to the pressure difference at 720, the system forms the pressure difference request PressDiffReq. This request is used in setting valves which control the pressure difference across the actuators of the variator, and hence control the reaction torque.

7. Correction of Powertrain Settings

This aspect will only be briefly described. For greater detail, the reader is referred to Torotrak's international patent application EP/2004/003293. Summarising, the process involves correcting the engine torque and/or reaction torque in a feedback loop to reduce deviation of the engine speed from that predicted based upon the estimated engine acceleration AccEngEst (FIG. 7). The steps involved are
a. Integrate AccEngEst, the estimated engine acceleration, with respect to time to obtain a prediction of engine speed;
b. Compare the predicted engine speed with actual engine speed and determine on this basis a "control effort" required to reduce the difference between the two;
c. Adjust the required values of engine torque TrqEngReq and/or variator pressure difference PressDiffReq to form the values used to control the engine and transmission.

The process is carried out using a feedback controller. A conventional proportional integral differential controller is used in current prototypes. If, for example, actual engine speed is less than predicted engine speed, the corrective action is to reduce the engine loading by adjustment of the reaction torque and/or to increase the engine torque. The magnitude of the required correction (i.e. the required adjustment to the engine loading/engine torque balance, which adjustment can itself be expressed as a torque) is the control effort. If engine speed is greater than the prediction then the corrective action is to increase engine loading and/or decrease engine torque. Adjustment is made preferentially to the loading torque—i.e. to the variator—in view of its quick response. Only if implementing the control effort through the variator alone would result in an unacceptably large deviation of the wheel torque from the desired value is adjustment made additionally to the engine torque.

What is claimed:

1. A method of controlling a motor vehicle powertrain comprising an engine which provides a controllable engine torque and acts through a continuously variable transmission comprising a torque-controlled variator to apply wheel torque to driven wheel(s) of the motor vehicle, the transmission being of the torque-controlled type, and the method comprising:
determining a reaction torque requirement, the reaction torque being generated in the torque-controlled variator, and an engine torque requirement suitable to create a desired wheel torque and a desired engine acceleration; and
setting the engine torque and reaction torque accordingly, the engine torque and reaction torque being independently controllable, and being characterised in that the aforementioned calculation involves estimating and allowing for vehicle acceleration.

2. A method as claimed in claim 1 wherein the estimation of vehicle acceleration is based upon the desired wheel torque.

3. A method as claimed in claim 1 wherein the estimation of vehicle acceleration is carried out using an adaptive model whose adjustable parameters include vehicle mass and road gradient.

4. A method as claimed in claim 1 wherein the estimation of vehicle acceleration involves estimation of braking force applied by the vehicle brakes.

5. A method as claimed in claim 1 wherein the desired engine acceleration is determined on the basis of current engine speed and a target engine speed.

6. A method as claimed in claim 5 wherein the target engine speed is determined on the basis of driver input.

7. A method as claimed in claim 1 wherein the desired wheel torque is determined on the basis of driver input.

8. A method as claimed in claim 1 wherein the engine torque requirement is the sum of (i) the engine torque needed to accelerate moments of inertia of the engine and transmission, taking account of desired engine acceleration and estimated vehicle acceleration and (ii) the engine torque needed to provide the desired wheel torque, acting through the transmission.

9. A method as claimed in claim 8 wherein a model of the transmission, taking account of both current transmission ratio and transmission efficiency, is used in determining the engine torque needed to provide the desired wheel torque.

10. A method as claimed in claim 8 wherein, in calculating the engine torque needed to accelerate moments of inertia of the engine and transmission, allowance is made for (a) an engine-side inertia, contributed by those rotary engine and transmission components whose speed is proportional to engine speed, and (b) a free inertia, contributed by those transmission components whose speed is dependent upon speed of both the engine and the driven wheel(s) of the motor vehicle.

11. A method as claimed in claim 10 wherein acceleration of the free inertia is estimated based upon the desired engine acceleration and the estimated vehicle acceleration.

12. A method as claimed in claim 1 wherein the engine torque requirement is the sum of (i) the engine torque needed to accelerate an engine-side inertia, contributed by those rotary engine and transmission components whose speed is proportional to engine speed, (ii) the engine torque needed to accelerate a free inertia, contributed by those components of the transmission whose speed is dependent upon speed of both the engine and the driven wheels, and (iii) the engine torque needed to accelerate the vehicle.

13. A method as claimed in claim 12 wherein the reaction torque requirement is the sum of (a) the reaction torque required to cause acceleration of the free inertia, and (b) the reaction torque required to cause acceleration of the vehicle.

14. A method as claimed in claim 1 further comprising determining, taking account of lag in the engine's response, an estimated instantaneous engine torque, and taking account of this in setting the reaction torque.

* * * * *